United States Patent [19]

DeLellis

[11] Patent Number: 4,767,037
[45] Date of Patent: Aug. 30, 1988

[54] CYCLE CARRIER

[76] Inventor: Russell DeLellis, 202 N. A St., #13, Lake Worth, Fla. 33460

[21] Appl. No.: 649,490

[22] Filed: Sep. 11, 1984

[51] Int. Cl.$^4$ .............................................. B60R 9/06
[52] U.S. Cl. ........................... 224/42.03 B; 224/42.07
[58] Field of Search ............... 224/42.03 B, 42.45 R, 224/273, 309, 42.07; 211/5; 280/760, 769

[56] References Cited

U.S. PATENT DOCUMENTS

| | | | |
|---|---|---|---|
| 2,499,654 | 3/1950 | Kuhlman | 224/42.45 R |
| 3,447,727 | 6/1969 | Lowe | 224/42.45 R |
| 3,504,831 | 4/1970 | Highnote | 224/42.03 B |
| 3,744,689 | 7/1973 | Kjensmo | 224/42.03 B |
| 3,853,255 | 12/1974 | Spencer | 224/42.03 B |
| 3,887,075 | 6/1975 | Harvey | 211/5 |
| 4,182,454 | 1/1980 | Tohms | 211/5 |
| 4,213,729 | 7/1980 | Cowles et al. | 224/42.03 B X |

FOREIGN PATENT DOCUMENTS 1027527  3/1978  Canada .......................... 224/42.03 B

*Primary Examiner*—Henry J. Recla
*Assistant Examiner*—Robert M. Petrik
*Attorney, Agent, or Firm*—Malin, Haley & McHale

[57] ABSTRACT

Disclosed herein is a cycle carrier for carrying a motorcycle or bicycle on the side of a vehicle. The carrier has a pair of buckets into which the cycle tires fit and an A-frame means between the buckets. The apex of the A-frame is affixed to the cycle. The buckets are attached to the frame of the vehicle.

13 Claims, 2 Drawing Sheets

CYCLE CARRIER

This invention relates to a cycle carrier and more particularly to such a carrier adapted to being placed on the side of a vehicle for carrying motorcycle.

It is quite common to carry a bicycle or motorcycle on a car or small truck for the purpose of using the two-wheel vehicle when the driver arrives at the destination. For example, a person may desire to go to camping and have a motorcycle available when he arrives at the campsite. Typically, carrying a cycle has been done by attaching means to the back of the vehicle or to the back bumper of the vehicle to hold the motorcyle or bicycle. This technique has several disadvantages. First, in many instances it is desirable to carry a trailer or camper attached to the back bumper and attaching the motorcycle or bicycle to the back bumper interfers with the trailer. Second, attaching the bicycle or motorcycle to the back bumper invites damage to the cycle, particularly if the vehicle carrying the cycle backed into a wall or another parked vehicle, or in the event of a rear end collision. A third problem with attaching a cycle to the back bumper is that long loads cannot be carried in the trunk of a car or bed of a truck since the cycle would interfere.

Typical of the type of prior art devices used to carry a bicycle or motorcycle on either the back or the front of an automobile or small truck can be found in U.S. Pat. Nos. 4,193,526, 3,891,132, 3,853,255, 3,744,689, 3,229,874, 2,576,222, 2,541,244 and 1,865,365. While the apparatus of each of the above mentioned patents may be different in many respects they are all common in that the three disadvantages mentioned above apply equally to each of them.

As modern vehicles are designed to be smaller and smaller, particularly in the width dimension it is possible to carry a motorcycle or bicycle on the side of a vehicle without exceeding the maximum width requirements for that vehicle. By carrying a bicycle or motorcycle on the side of a vehicle rather than the back the three disadvantages mentioned above are all overcome.

In accordance with one aspect of this invention there is provided a cycle carrier adapted to being attached to the side of a vehicle comprising a pair of buckets each of which is sized to receive one tire of the cycle and each of which includes means for being attached to the vehicle at a separated distance equal to the wheel base of the cycle. Additionally, the carrier includes A frame means, the base of which is connected to the buckets and the apex of which is positioned to be adjacent to the frame of the cycle when the cycle is received into the buckets and securing means for securing the apex of the A frame means to the cycle frame.

One preferred embodiment of the subject invention is hereafter described with specific reference being made to the following figures, in which.

Figure 1:
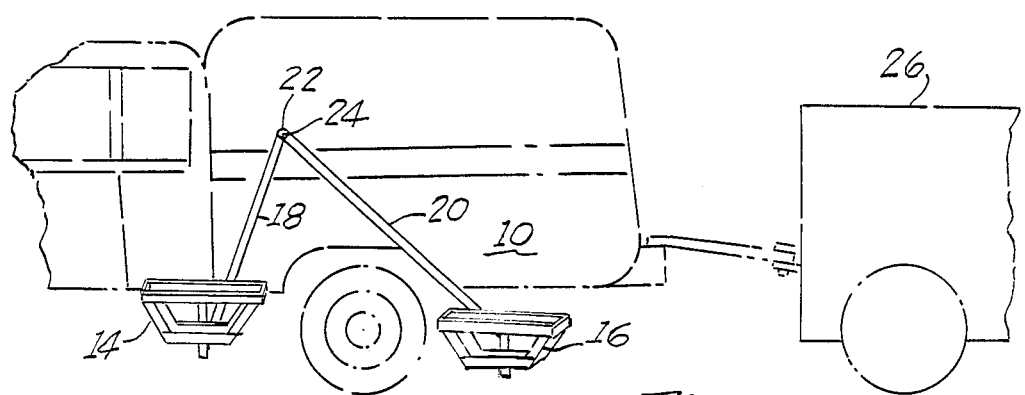
FIG. 1 shows the manner in which the cycle carrier is attached to a vehicle.

Referring now to FIG. 1, the cycle carrier 10 of the subject invention is shown attached to the side of the pick-up truck 12 and designed in the preferred embodiment to accomodate a motorcycle. Carrier 10 consists of a front bucket 14 and rear bucket 16 separated by an amount equal to the wheel base of the motorcycle to be placed therein. A front A frame support 18 is connected to a rear A frame support 20 at apex 22. The bottom of A frame support 18 is connected to front bucket 14 and a bottom of a rear A frame support 20 is connected to rear bucket 16. An apex bolt 24 extends from an area near apex 22 and is positioned to fit through the motorcycle and be attached to the frame thereof to hold it firmly in carrier 10.

Also shown in FIG. 1 is a trailer 26 attached to truck 12 which as seen would interfere with a motorcycle from being carried on the rear of truck 12 and also possibly cause too much weight on the rear of truck 12.

Figure 2:
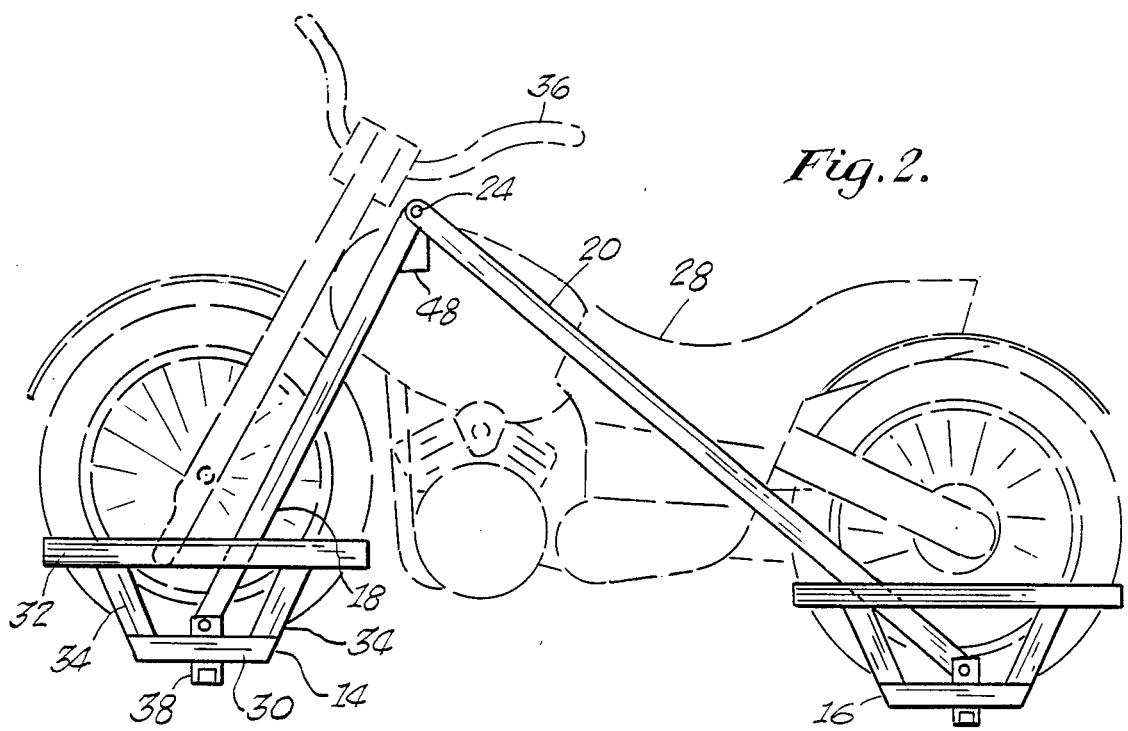
FIG. 2 shows in phantom, a motorcycle received into the carrier.

Referring now to FIG. 2 a motorcycle 28 is shown inserted into carrier 10 with the front tire of motorcycle 28 positioned in bucket 14 and the rear tire positioned in bucket 16. Buckets 14 and 16 should be sized to receive the tires of motorcycle 28 such that the bottom of the tire rests on the base 30 of the bucket and the hoop 32 of the bucket 14 or 16 firmly surrounds the wheel of motorcycle 28. The size of hoop 32 of course would depend on the length of the bucket supports 34 which connect the base 30 and the hoop 32. Hoops 32 may be made adjustable in size as may be its position on support 34.

Motorcycle 28 is placed into front bucket 14 and rear bucket 16 as shown in FIG. 2. The apex bolt 24 is inserted from the apex 22 of the A frame, consisting of supports 18 and 20, to intersect the frame of motorcycle 28 and hold it firmly in place. The handle bars 36 of motorcycle 28 may be turned to run generally parallel to the motorcycle or may be removed from the motorcycle 28. It is important that the handle bars 36 not extend widthwise beyond the width of the motorcycles, nor interfere with the side of truck 12.

Figure 3:
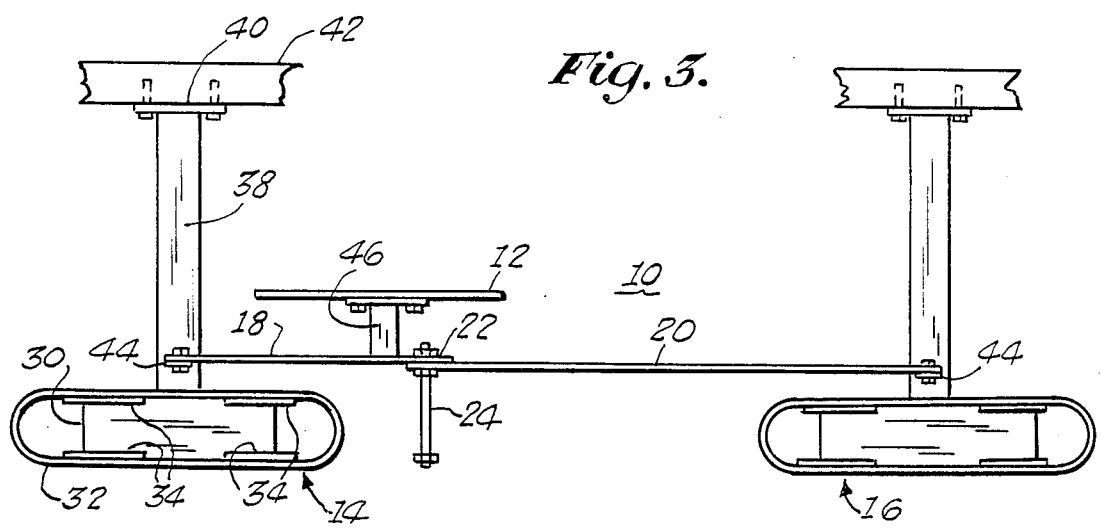
FIG. 3 shows a top view of the cycle carrier remote from the vehicle.
Figure 4:
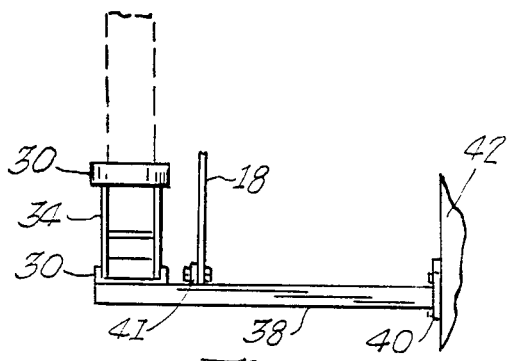
FIG. 4 shows an end view of the cycle carrier as attached to the vehicle.
Figure 5:
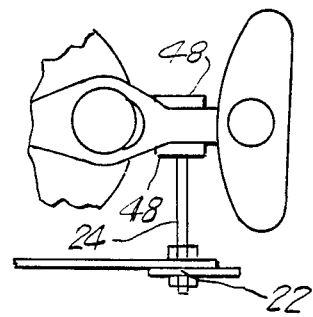
FIG. 5 shows a top view of the carrier and how it is affixed to the frame of a motorcycle.

Referring now to FIGS. 3, 4 and 5, the detailed construction of motorcycle carrier 10 will be described. Hoop 32 may be a flat iron bar sized to surround the tire of motorcycle 28 at the height determined by bucket support 34. It may also include holes along the bar and be separated into two halves so as to be adjustable. Base 30 of each bucket may be a U-shaped channel positioned so that the tire sits in the channel. The other side of base 30 is bolted or welded to one end of a frame extension 38, which also may be a U-shaped channel. The other end of extension 38 may be secured by mounts 40 welded thereto to the frame 42 of truck 12. Mounts 40 may be secured, for instance, by bolting mounts 40 to frame 42 or in the alternative, by a slip in connector shown and described hereafter with respect to FIGS. 7a and 7b. Also, a plate may be welded to frame 32 and mounts 40 secured to the plate.

As previously mentioned the back sides of both base 30 and extension 38 are secured together. The bucket supports 34 may be welded or screwed to the sides of base 30 at the angle shown in FIG. 2 and hoop 32 is secured by welding or bolts to supports 34. A support 44 for the A frame supports 18 or 20 is welded to extention 38 as shown in FIG. 4 and A frame supports 18 and 20 may be secured thereto by, for instance, a bolt.

Bucket 16 and its affixation to the frame of truck 12 is identical as that described with respect to bucket 14 and will not be repeated. It should be noted however that bucket 16 may be placed physically closer to the ground than bucket 14 as shown in FIGS. 1 and 2. This of course may depend on the positioning of the frame of truck 12.

The A frame supports 18 and 20 extend from the two supports 44 and meet at apex 22 and are connected together by apex bolt 24. One of the two frame supports 18 and 20, such as 18 shown in FIG. 3, may be secured to body of truck 12 by a member 46 to provide stability to carrier 10. Apex bolt 24 should be positioned to intersect the motorcycle in an area where it can be secured thereto. The securing may utilize members attached to or from bolt 24, such as the plates 48 shown in FIGS. 2 and 5. Of course other means besides plates 48 may be used to secure the motorcycle and this may depend on the particular cycle being carried and the positioning of various components of the cycle, such as the gas tank, seat or the like. The A frame suports 18' and 20 may have holes therein to adjust the apex 22 to any desired position.

Figure 6:
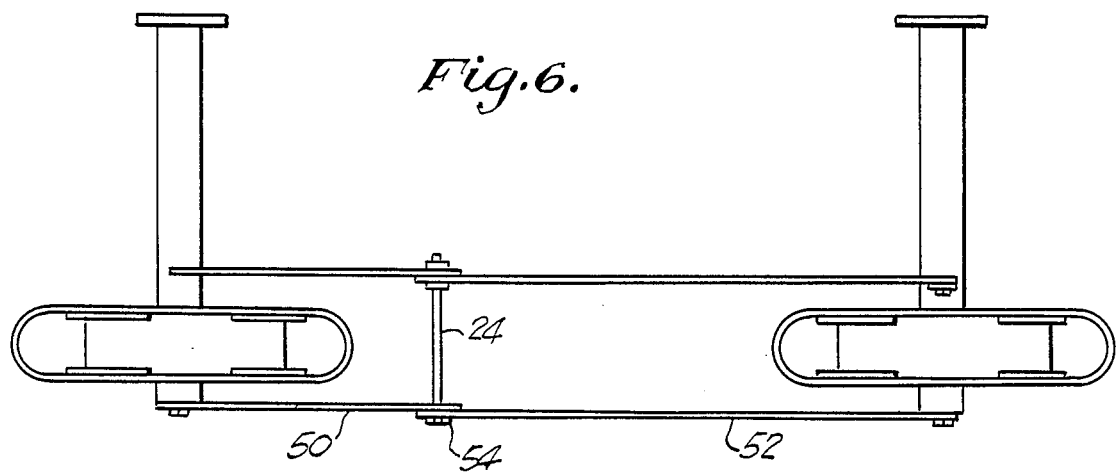
FIG. 6 shows an alternate embodiment of the cycle carrier to the subject invention.

An alternate embodiment of the manner of securing motorcycle 28 into carrier 10 is shown in FIG. 6 in which a second set of A frame supports 50 and 52 are shown which may be secured to extensions 38 and have an apex 54 positioned to receive bolt 24. In this instance bolt 24 may be secured through the center of motorcycle 28, which may be held firmly by both sets of A frame supports 18 and 20 and 50 and 52.

Figure 7A:
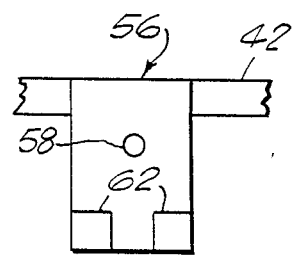
FIGS. 7A and 7B show an alternate manner of attaching the cycle carrier to the frame of the vehicle.
Figure 7B:
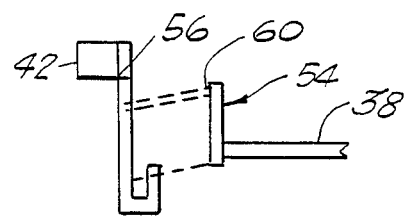

An alternate manner of affixing extentions 38 to the frame is shown in FIGS. 7a and 7b. The end of extentions 38 has attached thereto a mount 54 which may be slipped into a mount receiver 56. Mount receiver 56 has a hole 58 therein which is designed to be aligned with a hole 60 in mount 54. In the improvement shown in FIGS. 7a and 7b mount receiver 56 is generally an L-shaped element having a pair of plates 62 separated by an opening 64 attached to the front thereto. Mount 54 slips in with extension 38 being positioned in the opening between plates 62 holding mount 54. A screw may be secured through the two holes 58 and 60 to further hold the support in place. Mount receiver 56 may be welded or bolted to the frame 42 of truck 12.

Another alternative to the invention is that the sides of buckets 14 and 16 may pivot downward and act as ramps to facilitate the placing of a cycle in the carrier. A platform could also couple the two buckets 14 and 16 to aid in inserting the cycle.

What is claimed is:

1. A cycle carrier adapted to being attached to the side of a vehicle comprising:
    a pair of buckets, each of which is sized to receive one tire of said cycle and each of which includes means for being attached to said vehicle at a separated distance equal to the wheelbase of said cycle;
    A-frame means the base of which is connected to said buckets and the apex of which is positioned to be adjacent to the frame of said cycle when said cycle is received in said buckets; and
    securing means for securing said A-frame means to said cycle frame.

2. The invention according to claim 1 wherein the apex of said A-frame means is rigidly secured to said cycle frame.

3. The invention according to claim 2 wherein said A-frame means is rigidly affixed to said vehicle.

4. The invention according to claim 1 wherein said A-frame means is rigidly affixed to said vehicle.

5. The invention according to claim 1 wherein said carrier further comprises a second A-frame means positioned on the side of said cycle opposite from the side said first mentioned A-frame means is positioned.

6. The invention according to claim 5 wherein the apex of each of said first and second A-frame means are coupled together through the frame of said cycle.

7. The invention according to claim 1 wherein each of said buckets includes a hoop, a base and means rigidly connecting said hoop and base, said base being coupled to one end of said attaching means, and the other end of said attaching means being coupled to the frame of said vehicle.

8. The invention according to claim 7 wherein the attaching means of each bucket includes support means positioned near said end to which said bucket is attached for having attached thereto the base of said A-frame means.

9. The invention according to claim 8 wherein said attaching means includes means for telescopic engagement into a mount attached to said frame for attachment to said frame.

10. The invention according to claim 9 wherein the apex of said A-frame means is rigidly to said cycle frame.

11. The invention according to claim 10 wherein said A-frame means is rigidly affixed to said vehicle.

12. The invention according to claim 9 wherein said carrier further comprises a second A-frame means positioned on the side of said cycle opposite from the side said first mentioned A-frame means is positioned.

13. The invention according to claim 12 wherein the apex of each of said first and second A-frame means are coupled together through the frame of said cycle.

* * * * *